Feb. 6, 1962 E. M. JEPPSSON 3,019,860
AUTOMATIC, SINGLE-ACTING BRAKE SLACK ADJUSTERS
Filed July 6, 1960 4 Sheets-Sheet 1

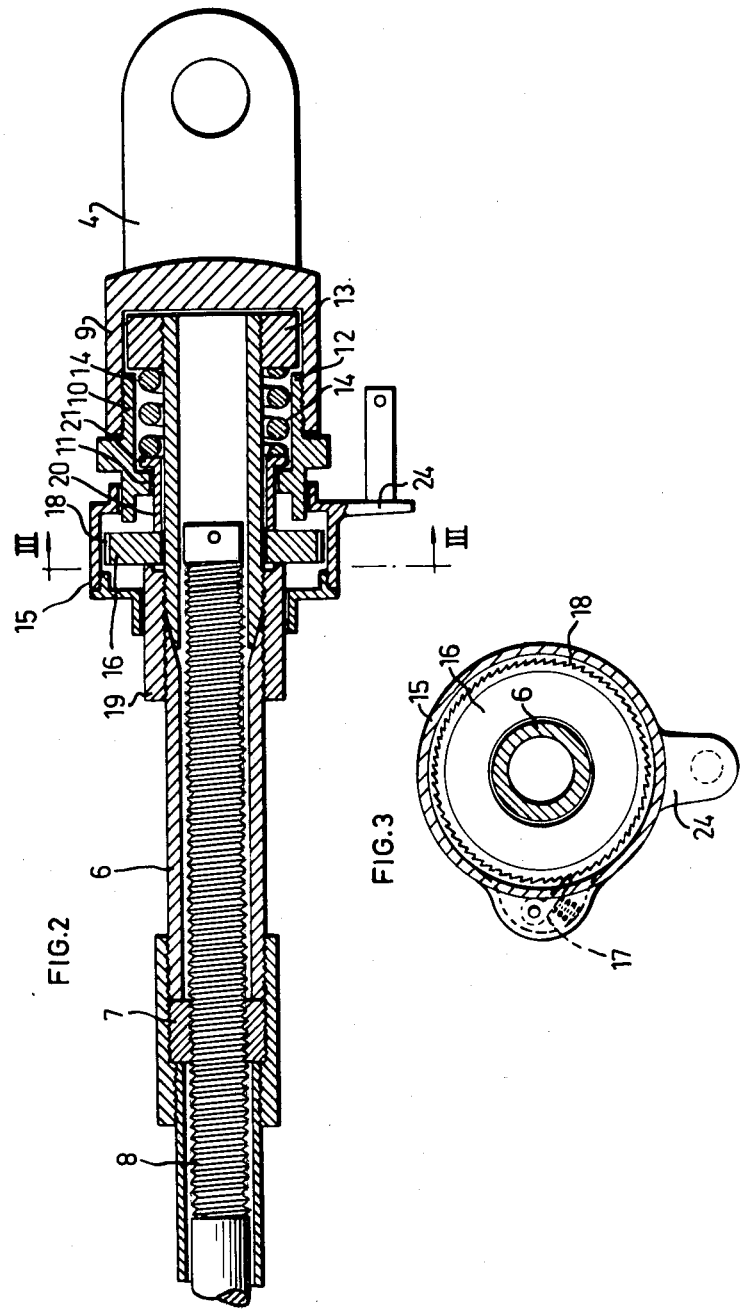

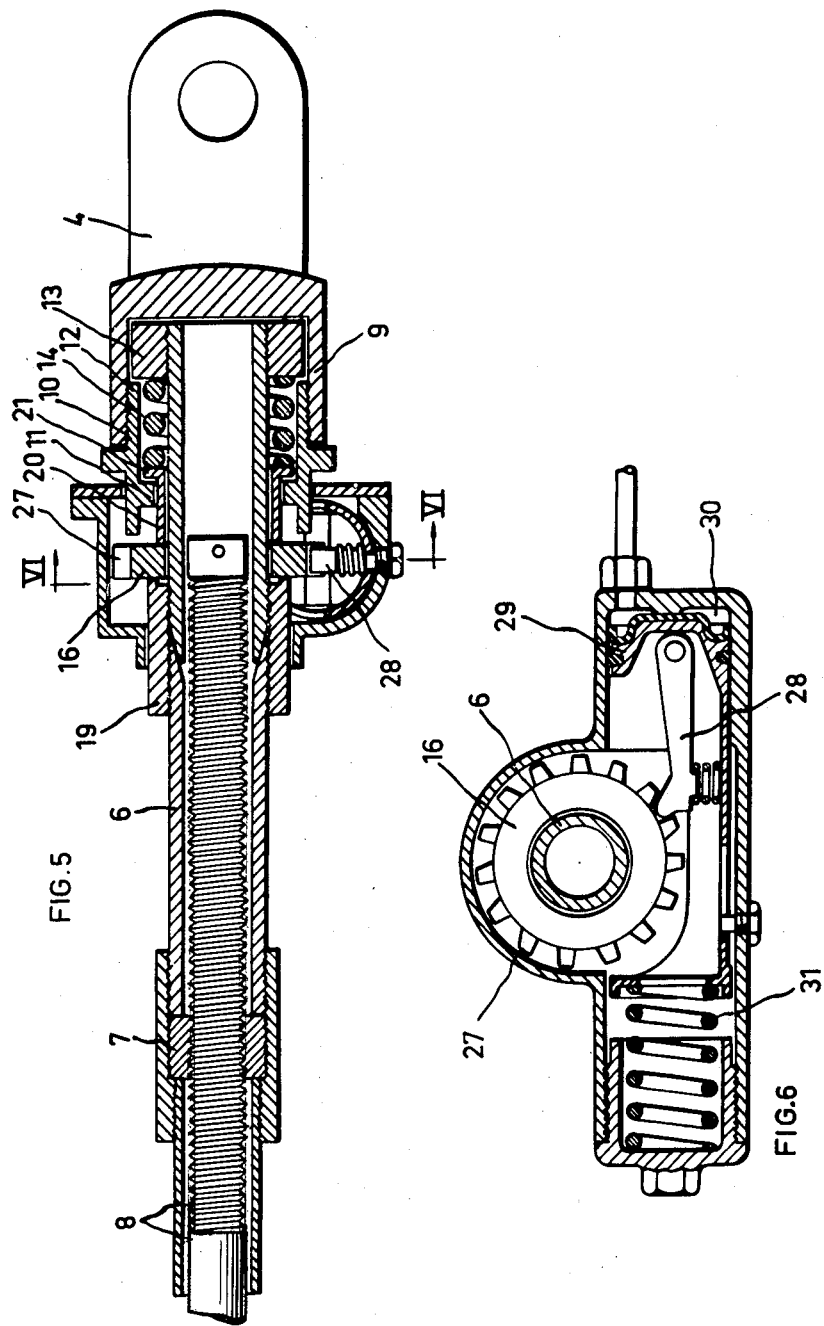

United States Patent Office 3,019,860
Patented Feb. 6, 1962

3,019,860
AUTOMATIC, SINGLE-ACTING BRAKE
SLACK ADJUSTERS
Erik Mauritz Jeppsson, Malmo, Sweden, assignor to
Svenska Aktiebolaget Bromsregulator, Malmo, Sweden,
a corporation of Sweden
Filed July 6, 1960, Ser. No. 41,176
Claims priority, application France July 9, 1959
3 Claims. (Cl. 188—196)

This invention relates to an automatic, single-acting brake slack adjuster comprising a brake rod to be connected in a vehicle, especially a railway vehicle brake rigging so as to form part thereof and transmit the brake power on braking. More particularly the invention relates to an automatic, single-acting brake slack adjuster of the type in which the brake rod comprises two rod parts to be non-rotatably connected in the brake rigging and between them a rotatable rod part having a small axial play in relation to the first and being threadedly engaged with the second of said non-rotatable rod parts, and in which said rotatable rod part is to be rotated in the direction for taking up brake slack by means operating automatically in dependence on the movement of the brake and comprising a one-way driving device with a driven member rotatably mounted on said rotatable rod part, a clutch between said driven member and said rotatable rod part, and a compressed spring that is disposed between axially spaced shoulders on said first non-rotatable rod part and said rotatable rod part, said clutch being normally subjected to and engaged by the pressure of said compressed spring and disengaged by being relieved of the pressure of said compressed spring on yielding thereof to stress arising in said brake rod when transmitting brake power.

In the most advanced prior art construction of an automatic, single-acting brake slack adjuster of the type set forth above, the compressed spring between the shoulders on the first non-rotatable rod part and the rotatable rod part exerts its pressure on the clutch between the driven member of the one-way driving device of the operating means and the rotatable rod part by the intermediary of the latter.

In accordance with the present invention there is provided for the transmission of the pressure of the compressed spring onto the clutch a separate sleeve which is disposed between the first non-rotatable rod part and the rotatable rod part and is axially displaceable in relation thereto and has a shoulder disposed between the shoulder on the first non-rotatable rod part and the compressed spring. The arrangement is preferably such that normally there is between the shoulder on the sleeve and the shoulder on the first non-rotatable rod part an axial clearance that is smaller than the small axial play of the rotatable rod part in relation to the first non-rotatable rod part. An antifriction thrust bearing may be disposed between the compressed spring and the clutch so as to partake in the transmission of the pressure of the compressed spring onto the clutch by the intermediary of the axially displaceable sleeve which preferably should be rotatable in relation to the first non-rotatable rod part and coupled for rotation together with the rotatable rod part for instance by means of the compressed spring.

One advantage gained by this improvement is to be seen in the simple and reliable manner in which it reduces undesirable frictional resistance to the operation of the slack adjuster by its operating means for taking up excess slack. This reduction of undesirable frictional resistance is advantageous by diminishing the strain which the operating means will be subjected to and have to be dimensioned for.

The above described and further features and advantages of the invention will be apparent to those skilled in the art from the following description of forms of the invention shown by way of examples in the accompanying drawings in which:

FIG. 2 is a longitudinal section of one form of the three-part brake rod of the slack adjuster.

FIG. 3 is a cross section substantially on line III—III in FIG. 2.

FIG. 5 is a longitudinal section of the brake rod of a slack adjuster with a different type of actuating device.

FIG. 6 is a cross section substantially on line VI—VI in FIG. 5.

Figure 1:
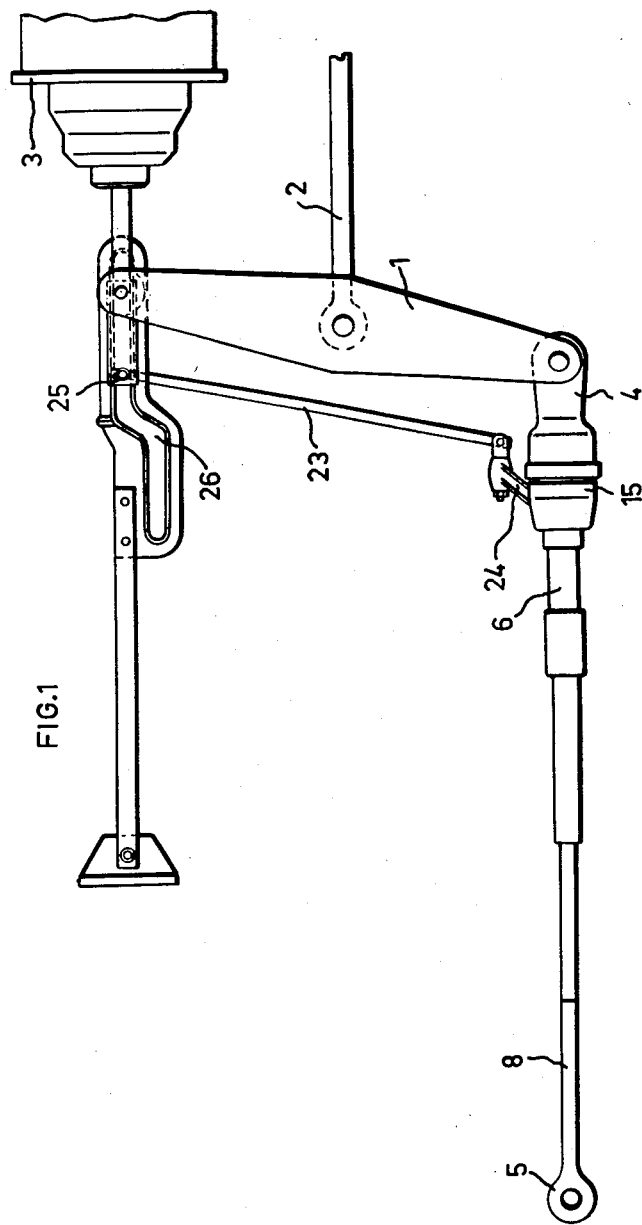
FIG. 1 is a fragmental plan view of a railway brake rigging including an automatic slack adjuster according to the invention with a well known type of actuating device.

The automatic slack adjuster comprises a three-part brake rod having heads or jaws at its two ends for its connection in the brake rigging. In the form shown in FIG. 1 the brake rigging comprises a brake lever 1 fulcrumed between its ends to a tie rod 2 and pivoted at one end to the push rod of the brake cylinder 3. To the other end of the brake lever 1 is connected the head 4 of the non-rotatable first part of the three-part brake rod of the slack adjuster. To the head 5 of the also non-rotatable second end part of the three-part brake rod of the slack adjuster are connected further parts of the brake rigging which are not shown in FIG. 1 since they may be of practically any of the many existing types that are well known to those skilled in the art. As is apparent from FIGS. 2 to 6, the intermediate rod part 6 of the three-part brake rod of the slack adjuster is tubular and rotatable and comprises a nut 7. The second non-rotatable rod part having the head 5 comprises a spindle 8 which projects into the tubular intermediate rod part 6 and has a threaded portion engaging the threads of the nut 7. The lead of the coacting threads of the nut 7 and the spindle 8 is such as to make this screw-connection selflocking.

The first non-rotatable rod part having the head 4 comprises a socket portion 9 into which is screwed and secured a sleeve 10 having an internal shoulder 11. The inner end 12 of the sleeve 10 forms a shoulder providing an axial abutment coacting with an axial abutment on the inner end of the tubular intermediate rod part 6. This axial abutment is provided for by a shoulder 13 in the form of a ring secured on the inner end of the tubular rod part 6. On the tubular rod part 6 is an axially compressed coiled spring 14 disposed between the shoulder 13 and a sleeve 20 which is axially displaceable in relation to the rotatable rod part 6 and rotatable together therewith. The sleeve 20 has a shoulder 21 for coaction with the said shoulder 11 on the non-rotatable brake rod part 9. In the normal position of the slack adjuster at released brake there is an axial clearance between the shoulder 21 on the axially displaceable sleeve and the adjacent shoulder 11 on the non-rotatable rod part, which clearance is smaller than the axial clearance normally present between the coacting abutments formed by the inner end 12 of the sleeve 10 and the shoulder 13.

Figure 4:
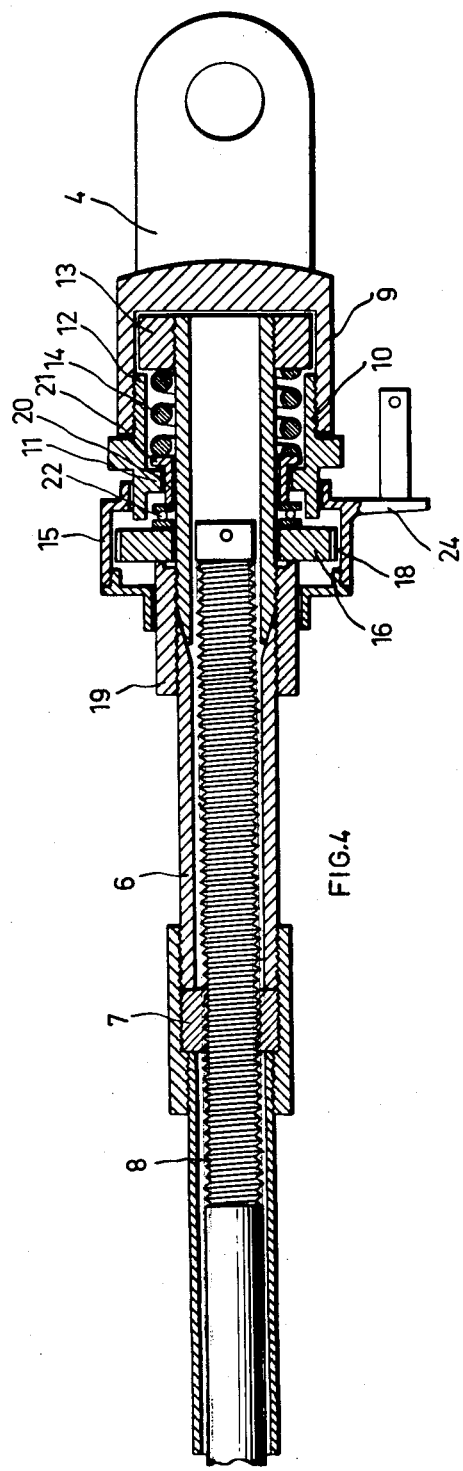
FIG. 4 is a longitudinal section of the slack adjuster brake rod and illustrates a modification of the showing of FIG. 2.

In the form illustrated in FIGS. 1–3 an operating member 15 is rotatably mounted on the brake rod and connected with the rotatable rod part 6 by a one-way driving device which in the form shown is constructed as a pawl and ratchet mechanism comprising a toothed ring 16 rotatably mounted on the rod part 6 and a spring-pressed pawl 17 (FIG. 3) pivoted to the operating member 15 and coacting with the teeth 18 on the outer periphery of the ring 16. The latter is connected with the rotatable rod part 6 by means of a friction clutch. The coacting friction surfaces of this clutch normally are pressed axially against each other by the axial pressure of the spring 14, in one direction by the intermediary of the rotatable rod part 6 and a muff 19 thereon and in the other direction by the intermediary of the sleeve 20. The coacting friction surfaces of the friction clutch between the rotatable ring 16 and the rotatable rod part 6 preferably consist of surfaces on the ring 16 and on the muff 19 and the sleeve 20 or on only one of these two. Thus the form of FIG. 2 can be modified by the provision of an antifriction thrust bearing 22 for instance between the sleeve 20 and the ring 16, as illustrated in FIG. 4, for enabling a still more easy slipping of the clutch when being relieved of the pressure of the spring 14.

The operating member 15 forms part of the means operating automatically in dependence on the movement of the brake and is adapted to be rotated in one direction during application and back again in the other direction during release of the brake for causing the slack adjuster to take up slack. The one-way driving device 16, 17, 18 betwen the operating member 15 and the rotatable rod part 6 is adapted to work in the last said direction in which the rod part 6 is to be rotated for taking up slack. In FIG. 1 the operating means shown are of the well known kind comprising a rod 23 linked at one end to an arm 24 on the operating member 15 and at the other end to a roller or slide 25 operatively connected to the push rod of the brake cylinder 3 and rolling or sliding in a suitably shaped guide 26.

At application of the brake, the brake force is first transmitted from the head 4 over the shoulder 11 to the shoulder 21 of the sleeve 20 through the spring 14, the shoulder 13 and from there through the tube 6, the nut 7 and the spindle 5. When the brake force has risen to a certain value, the spring 14 yields to the brake force, and the increasing brake force is then transmitted directly by the shoulders 12 and 13. When relieved of the pressure of the spring 14 on the yielding thereof to braking stress in the brake rod the clutch holding the rotatable ring 16 is disengaged. If the brake clearances are too large, the roller or slide 25 in the guide 26 will cause the arm 24 to rotate the operating member 15 before the spring 14 has yielded to the brake force. This rotation of the operating member 15 is transmitted by the said clutch to the tubular rod part 6 including the nut 7. If the brake clearances are of normal value, the rotation of the operating member 15 will not occur until the spring 14 has yielded to the brake force for disengaging the clutch holding the ring 16, and thus the rotation of the operating member is not transmitted to the tubular rod part 6 and no length adjustment of the brake rod of the slack adjuster takes place.

In the form of FIGS. 5 and 6 the actuating device is of a different kind which also is principally known, for instance from the U.S. Patent No. 1,898,549 of February 21, 1933, to Le Clair et al. Also in this form the one-way driving device included in the operating means is constructed as a ratchet mechanism comprising teeth 27 on the outer periphery of the ring 16 engaged by a spring pressed pawl 28. The pawl 28 is pivoted to a piston 29 which is movable in a piston chamber 30 and worked by compressed air being admitted thereto from the brake cylinder if and when on application of the brake the brake piston passes a certain position in the brake cylinder. On the following release of the brake the piston chamber 30 is vented to atmosphere through the brake cylinder, and the piston 29 is returned by a return spring 31.

What I claim and desire to secure by Letters Patent is:

1. An automatic, single-acting brake slack adjuster comprising a brake rod to be connected in a vehicle brake rigging so as to form part thereof and transmit brake power on braking, which brake rod comprises two non-rotatable rod parts connected by a rotatable rod part which has a small axial clearance relative to the first of said non-rotatable rod parts, coacting selflocking threads on said rotatable rod part and the second of said non-rotatable rod parts, and means for rotating said rotatable rod part in the direction for taking up brake slack automatically in response to the movement of the brake, comprising a one-way driving device with a driven member rotatably mounted on said rotatable rod part, and means forming a clutch between said driven member and said rotatable rod part and comprising coacting clutch surfaces associated with said driven member and said rotatable rod part, axially spaced shoulders on said first non-rotatable rod part and said rotatable rod part, a compressed spring disposed between said shoulders, an axially displaceable sleeve that is disposed between said first non-rotatable rod part and said rotatable rod part and is axially displaceable in relation thereto and has a shoulder disposed between said shoulder on said first non-rotatable rod part and said compressed spring and normally transmits the pressure of said compressed spring to said coacting cluch surfaces for holding them in engagement with one another, said shoulder on said sleeve and said shoulder on said first non-rotatable rod part normally having between them an axial clearance that is smaller than said first-named axial clearance, whereby said sleeve will relieve said coacting clutch surfaces of the pressure of said spring to bring about disengagement of said clutch on yielding of said spring to stress arising in said brake rod when transmitting brake power.

2. An automatic, single-acting brake slack adjuster as claimed in claim 1, in which an antifriction thrust bearing is disposed between said compressed spring and said clutch so as to partake in the transmission of the pressure of said compressed spring onto said clutch by the intermediary of said axially displaceable sleeve.

3. An automatic, single-acting brake slack adjuster as claimed in claim 1, in which said axially displaceable sleeve is rotatable in relation to said first non-rotatable rod part and coupled for rotation together with said rotatable rod part by means of said compressed spring.

References Cited in the file of this patent
UNITED STATES PATENTS

| | | |
|---|---|---|
| 1,590,502 | Djurson | June 29, 1926 |
| 1,835,008 | Browall | Dec. 8, 1931 |

FOREIGN PATENTS

| | | |
|---|---|---|
| 663,418 | Germany | Aug. 5, 1938 |